(12) United States Patent
Pan

(10) Patent No.: US 9,381,931 B1
(45) Date of Patent: Jul. 5, 2016

(54) GOLF CART FOLDABLE MECHANISM

(71) Applicant: Tsai Fu Pan, Yunlin (TW)

(72) Inventor: Tsai Fu Pan, Yunlin (TW)

( * ) Notice: Subject to any disclaimer, the term of this patent is extended or adjusted under 35 U.S.C. 154(b) by 0 days.

(21) Appl. No.: 14/723,530

(22) Filed: May 28, 2015

(51) Int. Cl.
*B62B 3/10* (2006.01)
*B62B 3/02* (2006.01)
*B62B 3/12* (2006.01)
*B62B 1/26* (2006.01)

(52) U.S. Cl.
CPC .............. *B62B 3/025* (2013.01); *B62B 3/104* (2013.01); *B62B 3/12* (2013.01); *A63B 55/60* (2015.10); *B62B 1/262* (2013.01); *B62B 3/106* (2013.01)

(58) Field of Classification Search
CPC ............ B62B 3/022–3/025; B62B 3/104; B62B 3/12; B62B 3/102; B62B 3/106; B62B 3/262; B62B 1/262; A63B 55/60
See application file for complete search history.

(56) References Cited

U.S. PATENT DOCUMENTS

| | | | | |
|---|---|---|---|---|
| 5,829,585 A * | 11/1998 | Kao | ......... | B62B 1/047 206/315.3 |
| 5,871,183 A * | 2/1999 | Milluzzi | ......... | B62B 1/045 224/274 |
| 6,007,031 A * | 12/1999 | Tang | ......... | B62B 1/045 206/315.3 |
| 6,425,589 B1 * | 7/2002 | Wu | ......... | A63B 55/60 150/159 |
| 6,435,539 B1 * | 8/2002 | Wu | ......... | B62B 1/045 280/42 |
| 6,481,518 B1 * | 11/2002 | Wu | ......... | B60K 7/0007 180/19.1 |
| 7,063,340 B1 * | 6/2006 | Wu | ......... | B62B 3/12 280/47.18 |
| 8,393,633 B2 | 3/2013 | Liao | | |
| 8,403,355 B2 | 3/2013 | Liao | | |
| 8,439,390 B2 | 5/2013 | Zhang | | |
| 8,544,871 B1 * | 10/2013 | Liao | ......... | B62B 3/02 280/62 |
| 8,672,342 B2 | 3/2014 | McCarthy | | |
| 8,820,775 B2 | 9/2014 | Wang | | |
| 8,820,776 B2 | 9/2014 | Wang | | |
| 8,944,443 B2 | 2/2015 | Lin | | |
| 9,004,505 B1 * | 4/2015 | Wu | ......... | B62B 3/022 280/38 |
| 9,079,598 B1 * | 7/2015 | Oreyang | ......... | B62B 3/022 |
| 2002/0113385 A1 * | 8/2002 | Kang | ......... | B62B 1/045 280/47.18 |
| 2004/0026897 A1 * | 2/2004 | Wu | ......... | B62B 1/045 280/652 |
| 2005/0040616 A1 * | 2/2005 | Cheng | ......... | B62B 3/02 280/47.24 |
| 2005/0258611 A1 * | 11/2005 | Wu | ......... | B62B 3/12 280/38 |
| 2006/0214382 A1 * | 9/2006 | Liao | ......... | B62B 3/12 280/47.18 |
| 2009/0295130 A1 * | 12/2009 | Liao | ......... | B62B 3/12 280/651 |
| 2011/0241314 A1 * | 10/2011 | Liao | ......... | B62B 3/02 280/651 |
| 2011/0285111 A1 * | 11/2011 | Liao | ......... | B62B 3/02 280/651 |
| 2011/0316258 A1 * | 12/2011 | Lin | ......... | B62B 3/02 280/651 |
| 2012/0025481 A1 * | 2/2012 | Wu | ......... | B62B 3/02 280/38 |
| 2012/0112436 A1 * | 5/2012 | Liao | ......... | B62B 3/02 280/651 |
| 2012/0261908 A1 * | 10/2012 | Liao | ......... | B62B 3/12 280/651 |
| 2014/0232077 A1 * | 8/2014 | Zhang | ......... | B62B 3/12 280/47.34 |
| 2014/0333049 A1 * | 11/2014 | Wu | ......... | A63B 55/08 280/651 |
| 2015/0054239 A1 * | 2/2015 | Stewart | ......... | A63B 55/08 280/38 |

* cited by examiner

*Primary Examiner* — Jeffrey J Restifo
*Assistant Examiner* — Erez Gurari
(74) *Attorney, Agent, or Firm* — Charles E. Baxley

(57) ABSTRACT

A golf cart includes a lever, a column pivotally attached to a rear end portion of the lever, a bracket having an intermediate portion pivotally secured to the front end portion of the lever for supporting a front wheel, a shank pivotally secured to the bracket and having a rear end portion pivotally secured to the column, and the bracket is pivoted relative to the lever when the shank is moved relative to the lever, a seat is attached to the shank, two rear wheels are attached to the seat with two linkages, and two linking rods are coupled between the linkages and the lever for moving the linkages and the rear wheels toward and away from each other when the shank is moved forwardly and rearwardly relative to the lever.

7 Claims, 5 Drawing Sheets

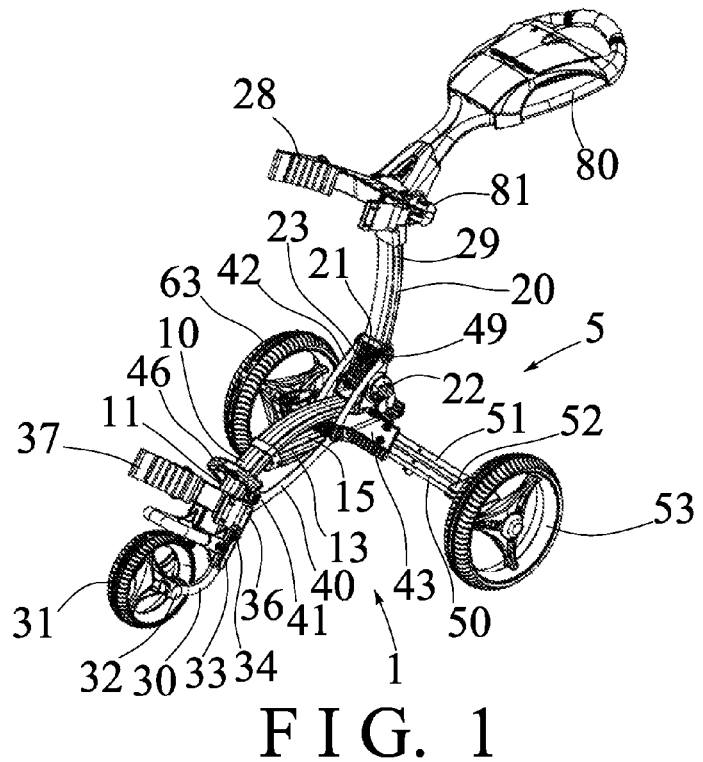
F I G. 1
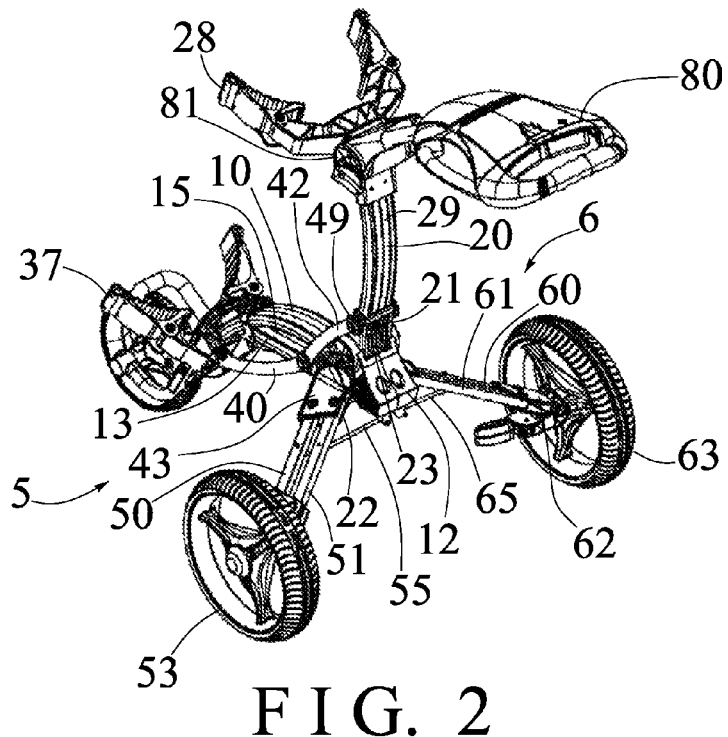
F I G. 2

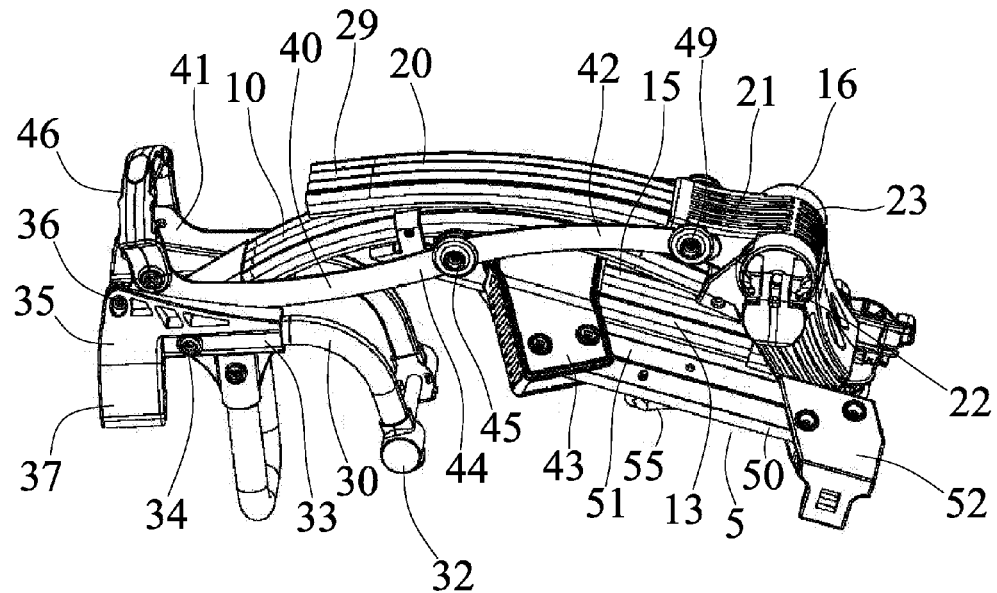
F I G. 9
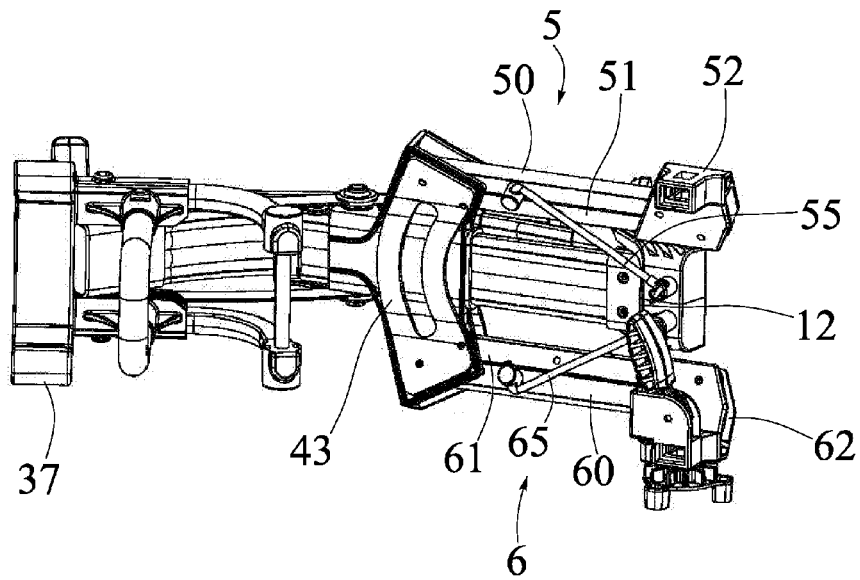
F I G. 10

GOLF CART FOLDABLE MECHANISM

BACKGROUND OF THE INVENTION

1. Field of the Invention

The present invention relates to a golf cart, and more particularly to a golf cart foldable mechanism including a foldable mechanism or structure allowable to be easily and quickly folded to a compact folding and storing structure by the user.

2. Description of the Prior Art

Various kinds of typical golf cart foldable mechanisms have been developed and foldable to a compact folding and storing structure, and normally comprise two or more limbs or levers foldable or rotatable relative to each other or movable toward each other into a compact folding and storing structure.

For example, U.S. Pat. No. 9,004,505 to Wu, U.S. Pat. No. 8,944,443 to Lin, U.S. Pat. No. 8,820,776 to Wang, U.S. Pat. No. 8,820,775 to Wang, U.S. Pat. No. 8,672,342 to McCarthy, U.S. Pat. No. 8,544,871 to Liao, U.S. Pat. No. 8,439,390 to Zhang, U.S. Pat. No. 8,403,355 to Liao, and U.S. Pat. No. 8,393,633 to Liao disclose several of the typical golf carts each also comprising two or more limbs or levers foldable or rotatable relative to each other or movable toward each other into a compact folding and storing structure.

However, normally, the limbs or levers of the typical golf carts may not be easily and quickly and stably folded to the compact folding and storing structure by the user. The rear wheels of the typical golf carts may not be moved away from each other toward an opened and stable working position.

The present invention has arisen to mitigate and/or obviate the afore-described disadvantages of the conventional golf cart foldable mechanisms.

SUMMARY OF THE INVENTION

The primary objective of the present invention is to provide a golf cart foldable mechanism including a foldable mechanism or structure allowable to be easily and quickly folded to a compact folding and storing structure by the user.

The other objective of the present invention is to provide a golf cart foldable mechanism including a foldable mechanism or structure for allowing the rear wheels to be moved away from each other toward an opened and stable working position and to be movable toward each other into a compact folding and storing structure.

In accordance with one aspect of the invention, there is provided a golf cart comprising a frame including a lever having a front end portion and a rear end portion, and the lever including a middle portion, a column including a lower end portion pivotally attached to the rear end portion of the lever, the column including an upper support and including an upper end portion, a handle rotatably attached to the upper end portion of the column and to be pivoted relative to the column, a bracket including a first end portion, and a second end portion, the bracket including an intermediate portion pivotally secured to the front end portion of the lever, and the bracket including a lower support, a front wheel rotatably attached to the first end portion of the bracket, a shank including a front end portion pivotally secured to the second end portion of the bracket for allowing the bracket to be pivoted relative to the lever by the shank when the shank is moved relative to the lever, the shank including a rear end portion pivotally secured to the column with a pivot shaft which is spaced from the rear end portion of the lever for allowing the shank to be moved forwardly and rearwardly relative to the lever when the column is pivoted forwardly and rearwardly relative to the lever, and the bracket being pivoted relative to the lever when the shank is moved forwardly and rearwardly relative to the lever, the shank including a middle portion, a seat attached to the middle portion of the shank, two linkages pivotally coupled to the seat, two rear wheels rotatably attached to the linkages respectively, and two linking rods pivotally coupled between the linkages and the rear end portion of the lever for moving the linkages toward and away from each other when the shank is moved forwardly and rearwardly relative to the lever for allowing the rear wheels to be moved away from each other toward an opened and stable working position and to be movable toward each other into a compact folding and storing structure.

The linkages each include two parallel arms pivotally coupled to the seat, and a carrier pivotally coupled to the arms for forming a parallelogramic structure, the rear wheels are rotatably attached to the carriers of the linkages respectively for allowing the rear wheels to be maintained at the right direction when the rear wheels are moved toward or away from each other.

The frame includes a bar attached to the lever for forming a guiding channel between the lever and the bar, and the seat is slidably received and engaged in the guiding channel of the frame for guiding and limiting the shank and the seat to move relative to the lever.

The bar is secured between the rear end portion and the middle portion of the lever. The shank includes a hand grip formed or provided thereon for moving or operating the shank relative to the lever. The handle is attached to the upper end portion of the column with a pivot joint for allowing the handle to be pivoted or rotated relative to the column between an outwardly or upwardly opened working position and an inwardly or downwardly folded or storing position where the handle is foldable toward and to engage with the column.

The lever includes two ring members provided on the rear end portion of the lever, the column includes a barrel provided on the lower end portion of the column and engaged between the ring members of the lever, and a quick release mechanism includes a spindle engaged in the barrel, a block secured to one end of the spindle, a follower slidably attached onto the spindle, and a knob attached the one end of the spindle for engaging with the follower and for forcing the follower to move toward the block and for selectively locking the column to the lever at selected angular positions.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a front perspective view of a golf cart foldable mechanism in accordance with the present invention;

FIG. 2 is a rear perspective view of the golf cart foldable mechanism;

FIG. 9 is a perspective view of the golf cart foldable mechanism, in which a portion or some of the elements have been removed for showing the inner structure of the golf cart foldable; and FIG. 10 is a bottom plan schematic view of the folded golf cart foldable mechanism, in which a portion or some of the elements have been removed for showing the inner structure of the golf cart foldable.

DETAILED DESCRIPTION OF THE PREFERRED EMBODIMENT

Figure 3:
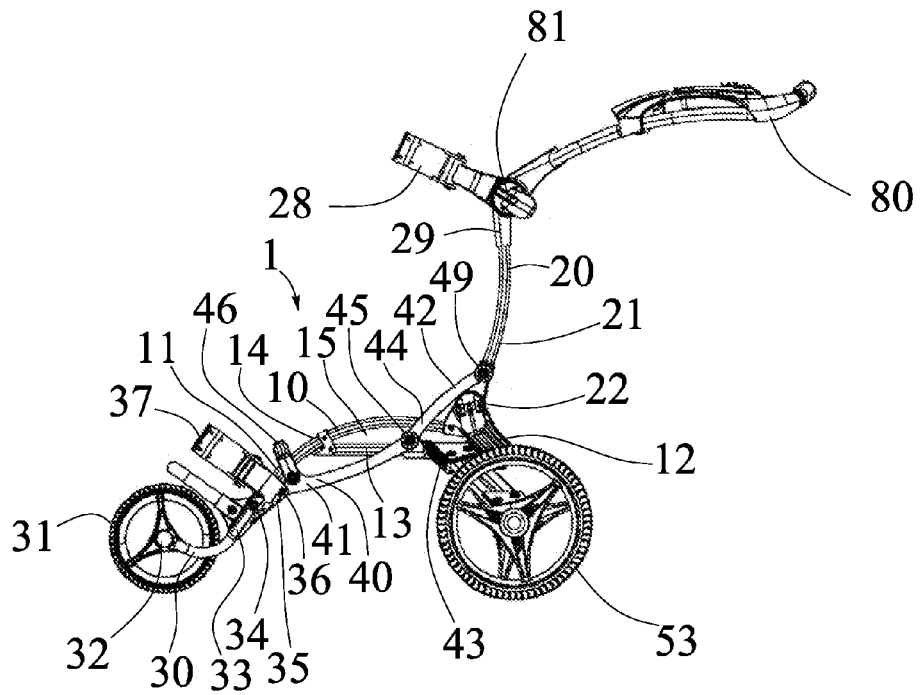
FIG. 3 is a right side plan schematic view of the golf cart foldable mechanism.
Figure 4:
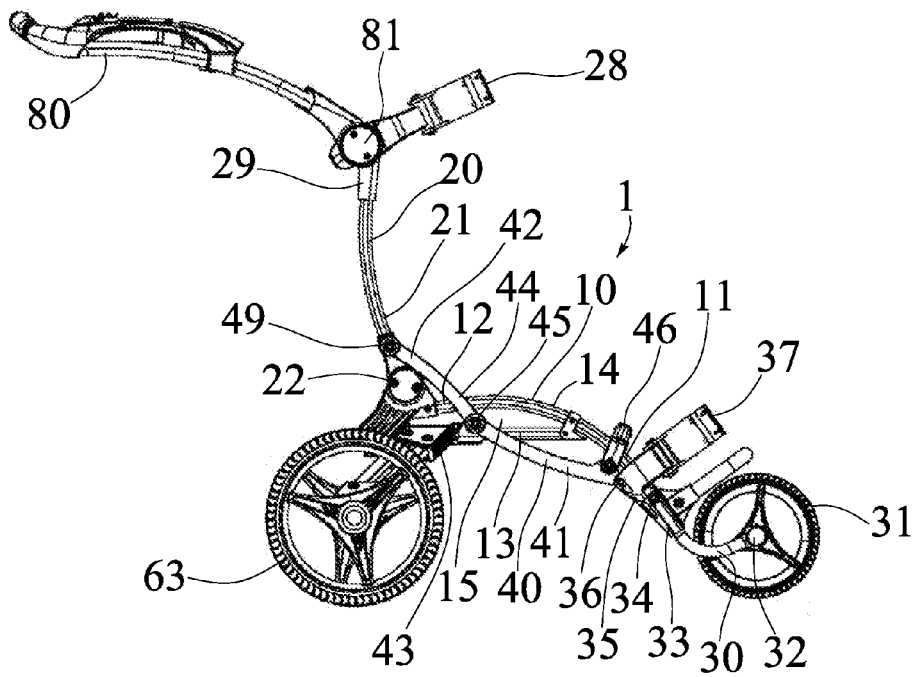
FIG. 4 is a left side plan schematic view of the golf cart foldable mechanism.
Figure 5:
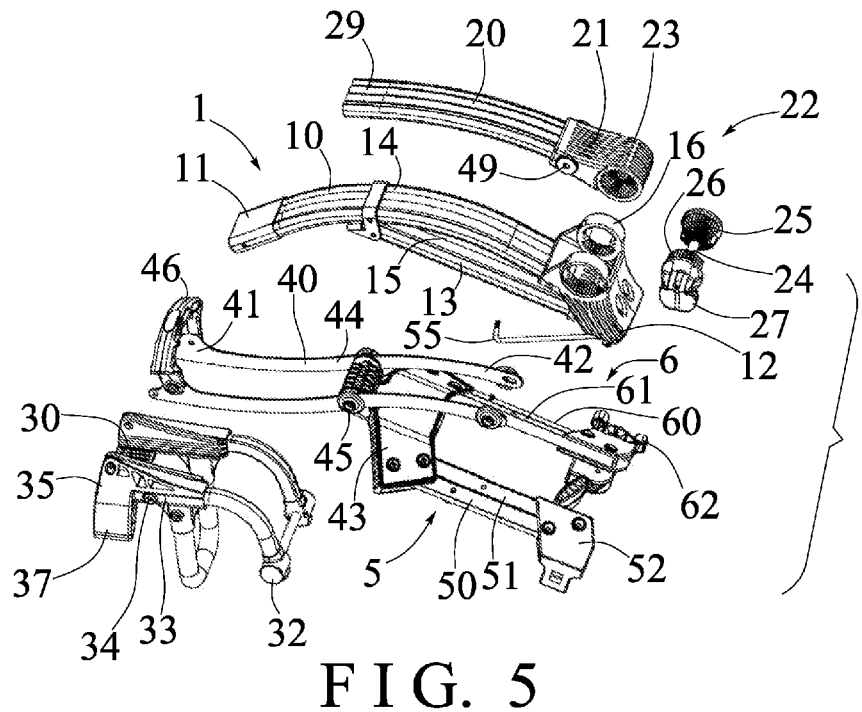
FIG. 5 is a partial exploded view of the golf cart foldable mechanism.

Referring to the drawings, and initially to FIGS. 1-5, a golf cart foldable mechanism in accordance with the present invention comprises a main frame 1 including a beam or lever 10 having an upwardly curved structure, the lever 10 includes one or front or first end portion 11 and another or rear or second end portion 12, and includes a beam or bar 13 attached or mounted or secured between the second or rear end portion 12 and the front or middle or intermediate portion 14 of the lever 10 for forming or defining a guiding passage or channel 15 between the lever 10 and the bar 13, the lever 10 further includes one or more (such as two) ring members 16 (FIG. 5) formed or provided on the rear end portion 12 of the lever 10.

A bar or column 20 includes one or lower or first end portion 21 pivotally or rotatably attached or mounted or secured to the rear end portion 12 of the lever 10 with a pivot shaft or quick release mechanism or pivot joint 22 or the like, for example, the quick release mechanism 22 includes a collar or barrel 23 formed or provided on the first or lower end portion 21 of the column 20 and disposed or mounted or engaged beside or between the ring members 16 of the lever 10 and aligned with the ring members 16 of the lever 10, and includes a spindle 24 disposed or engaged in the barrel 23, a stationary block 25 attached or mounted or secured to one end portion of the spindle 24, a movable element or follower 26 slidably attached or mounted or engaged onto the spindle 24, and a cam or knob 27 attached to the other end portion of the spindle 24 for engaging with the follower 26 and for forcing the follower 26 to move toward the block 25 and for locking or securing the column 20 to the lever 10 at selected angular positions or locations (FIGS. 1-4, 6-7 and 9).

A bracket 30 includes a front wheel 31 rotatably attached or mounted or secured to the front or first end portion 32 of the bracket 30, and includes a middle or intermediate portion 33 pivotally or rotatably attached or mounted or secured to the first or front end portion 11 of the lever 10 with a pivot pin 34 for allowing the bracket 30 and the front wheel 31 to be pivoted or rotated relative to the lever 10 between an outwardly opened working position (FIGS. 1-4) and an inwardly folded or storing position (FIGS. 6-10). The bracket 30 includes a rear or second end portion 35 for attaching or mounting a pivot rod 36. A lower support 37 is attached or mounted or secured to the rear or second end portion 35 of the bracket 30 for engaging with and for supporting the lower portion of the golf bag (not illustrated).

An upper support 28 may be attached or mounted or secured to the upper or second end portion 29 of the column 20 for engaging with and for supporting the upper portion of the golf bag (not illustrated). A hand grip or handle 80 may further be provided and attached or mounted or secured or coupled to the upper or second end portion 29 of the column 20 with a pivot shaft or quick release mechanism or pivot joint 81 or the like, and arranged for allowing the handle 80 to be pivoted or rotated relative to the column 20 between an outwardly or upwardly opened working position (FIGS. 1-4) and an inwardly or downwardly folded or storing position (FIGS. 6-7) where the handle 80 is foldable toward and to engage with the column 20.

A frame or stem or shank 40 includes a front or first end portion 41 pivotally or rotatably attached or mounted or secured to the rear or second end portion 35 of the bracket 30 with the pivot rod 36 for allowing the bracket 30 and the front wheel 31 to be pivoted or rotated relative to the lever 10 by or with the shank 40 when the shank 40 is moved forwardly and rearwardly relative to the lever 10, and includes a rear or second end portion 42 pivotally or rotatably attached or mounted or secured to the first or lower end portion 21 of the column 20 with a pivot shaft 49 which is spaced or separated from the barrel 23 and the rear end portion 12 of the lever 10 for a predetermined distance (FIGS. 1-5), such that the shank 40 may be moved forwardly relative to the lever 10 when the column 20 is pivoted or rotated forwardly relative to the lever 10. A handle or hand grip 46 may further be provided and attached or mounted or secured or coupled to the front or first end portion 41 of the shank 40 for moving or operating or actuating the shank 40 relative to the lever 10.

In operation, when the column 20 is pivoted or rotated forwardly relative to the lever 10 from the upwardly opened working position (FIGS. 1-4) to the downwardly folded or storing position (FIGS. 6-7 and 9), the shank 40 may also be moved forwardly relative to the lever 10 with or by the column 20, and the bracket 30 and the front wheel 31 may also be pivoted or rotated relative to the lever 10 from the outwardly opened working position (FIGS. 1-4) toward the inwardly folded or storing position (FIGS. 6-10). A plate or seat 43 is pivotally or rotatably attached or mounted or secured to the middle or intermediate portion 44 of the shank 40 with a pivot pole 45 and slidably received or engaged in the guiding channel 15 that is formed or defined between the lever 10 and the bar 13 of the frame 1 for guiding and limiting the middle or intermediate portion 44 of the shank 40 to move relative to the lever 10.

Two linkages 5, 6 each include two parallel beams or arms 50, 51; 60, 61 pivotally or rotatably attached or mounted or secured or coupled to the seat 43, and each include a carrier 52, 62 also pivotally or rotatably attached or mounted or secured or coupled to the arms 50, 51; 60, 61; i.e., the arms 50, 51; 60, 61 are pivotally or rotatably attached or mounted or secured or coupled between the seat 43 and the carrier 52, 62, and arranged for allowing the arms 50, 51; 60, 61 of the linkages 5, 6 to be pivoted or rotated relative to the seat 43 and the shank 40 between a laterally and outwardly opened working position (FIGS. 1-2) and an inwardly folded or storing position (FIGS. 6-10), and two rear wheels 53, 63 are rotatably attached or mounted or secured or coupled to the carrier 52, 62 of the linkages 5, 6 respectively.

Figure 6:
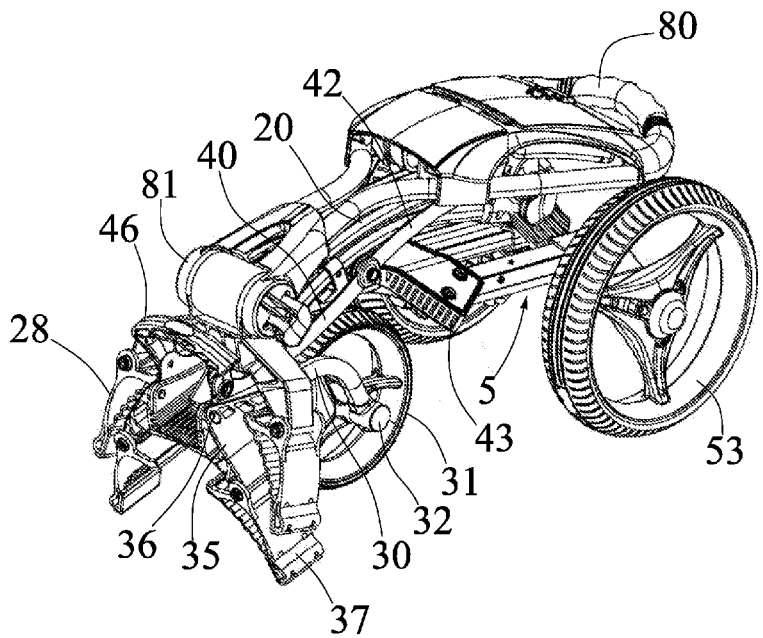
FIG. 6 is a front perspective view of the golf cart foldable mechanism, in a folding and storing structure.
Figure 7:
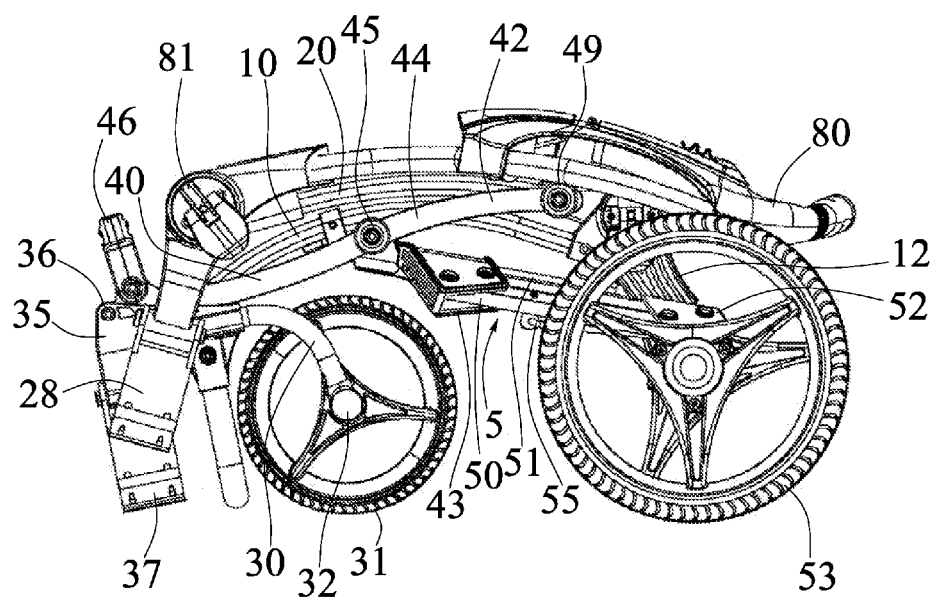
FIG. 7 is a right side plan schematic view of the folded golf cart foldable mechanism as shown in FIG. 6.
Figure 8:
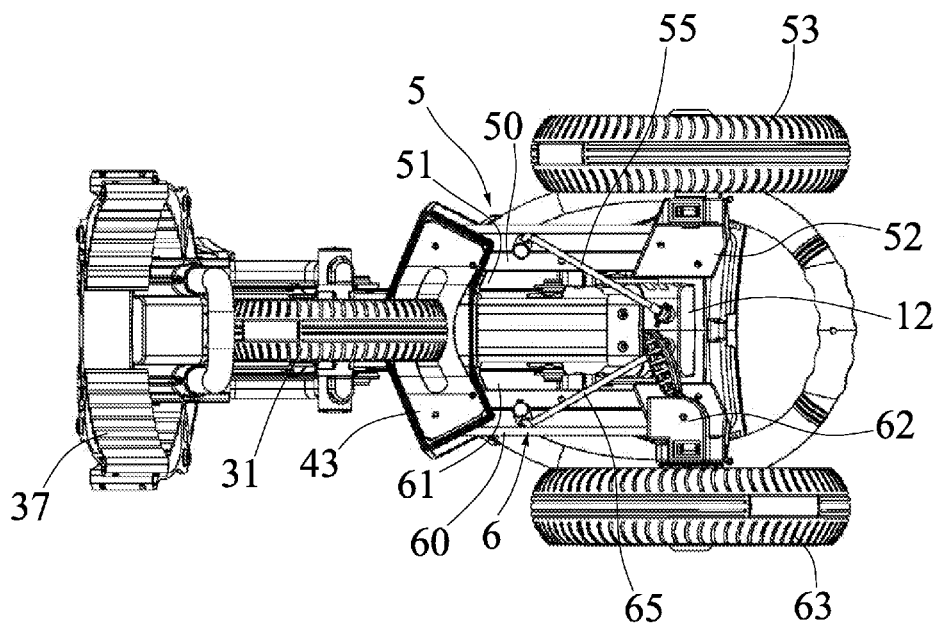
FIG. 8 is a bottom plan schematic view of the folded golf cart foldable mechanism as shown in FIGS. 6 and 7.

Two linking rods 55, 65 are pivotally or rotatably attached or mounted or secured or coupled between the arms 50, 51; 60, 61 of the linkages 5, 6 and the rear end portion 12 of the lever 10 (FIGS. 2, 5, 8, 10) for pivotally or rotatably attaching or mounting or coupling the arms 50, 51; 60, 61 of the linkages 5, 6 to the rear end portion 12 of the lever 10, and arranged for allowing the arms 50, 51; 60, 61 of the linkages 5, 6 to be pivoted or rotated relative to the seat 43 and the shank 40 from the laterally and outwardly opened working position (FIGS. 1-2) to the inwardly folded or storing position (FIGS. 6-10) when the seat 43 of the shank 40 is moved forwardly relative to the lever 10, and thus for allowing the rear wheels 53, 63 to be moved relative to the lever 10 from the laterally and outwardly opened working position (FIGS. 1-2) to the inwardly folded or storing position (FIGS. 6-7).

It is to be noted that the arms 50, 51; 60, 61 of each linkage 5, 6 are parallel to each other for forming a parallelogramic structure or configuration together with the seat 43 and the carriers 52, 62, and the carrier 52, 62 may maintained parallel to the seat 43 when the arms 50, 51; 60, 61 of the linkages 5, 6 are pivoted or rotated relative to the seat 43 and the shank 40 between the laterally and outwardly opened working position (FIGS. 1-2) and the inwardly folded or storing position (FIGS. 6-10), such that the rear wheels 53, 63 may be maintained at the right direction when the rear wheels 53, 63 are moved toward or away from each other. In addition, the rear wheels 53, 63 may be moved toward each other from the laterally and outwardly opened working position (FIGS. 1-2) to the inwardly folded or storing position (FIGS. 6-7) automatically with the linking rods 55, 65 when the seat 43 of the shank 40 is moved forwardly relative to the lever 10.

Accordingly, the golf cart foldable mechanism in accordance with the present invention includes a foldable mechanism or structure allowable to be easily and quickly folded to a compact folding and storing structure by the user.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A golf cart comprising:
    a frame including a lever having a front end portion and a rear end portion, and said lever including a middle portion,
    a column including a lower end portion pivotally attached to said rear end portion of said lever, said column including an upper support and including an upper end portion,
    a handle rotatably attached to said upper end portion of said column and to be pivoted relative to said column,
    a bracket including a first end portion, and a second end portion, said bracket including an intermediate portion pivotally secured to said front end portion of said lever, and said bracket including a lower support,
    a front wheel rotatably attached to said first end portion of said bracket,
    a shank including a front end portion pivotally secured to said second end portion of said bracket for allowing said bracket to be pivoted relative to said lever by said shank when said shank is moved relative to said lever, said shank including a rear end portion pivotally secured to said column with a pivot shaft which is spaced from said rear end portion of said lever for allowing said shank to be moved forwardly and rearwardly relative to said lever when said column is pivoted forwardly and rearwardly relative to said lever, and said bracket being pivoted relative to said lever when said shank is moved forwardly and rearwardly relative to said lever, said shank including a middle portion,
    a seat attached to said middle portion of said shank,
    two linkages pivotally coupled to said seat,
    two rear wheels rotatably attached to said linkages respectively, and
    two linking rods pivotally coupled between said linkages and said rear end portion of said lever for moving said linkages toward and away from each other when said shank is moved forwardly and rearwardly relative to said lever.

2. The golf cart as claimed in claim 1, wherein said linkages each include two parallel arms pivotally coupled to said seat, and a carrier pivotally coupled to said arms for forming a parallelogramic structure, said rear wheels are rotatably attached to said carriers of said linkages respectively.

3. The golf cart as claimed in claim 1, wherein said frame includes a bar attached to said lever for forming a guiding channel between said lever and said bar, said seat is slidably received and engaged in said guiding channel of said frame.

4. The golf cart as claimed in claim 3, wherein said bar is secured between said rear end portion and said middle portion of said lever.

5. The golf cart as claimed in claim 1, wherein said shank includes a hand grip for moving said shank relative to said lever.

6. The golf cart as claimed in claim 1, wherein said lever includes ring members provided on said rear end portion of said lever, said column includes a barrel provided on said lower end portion of said column and engaged between said ring members of said lever, a spindle is engaged in said barrel, a block is secured to said spindle, a follower is slidably attached onto said spindle, and a knob is attached said spindle for engaging with said follower and for forcing said follower to move toward said block and for locking said column to said lever at selected angular positions.

7. The golf cart as claimed in claim 1, wherein said handle is attached to said upper end portion of said column with a pivot joint.

* * * * *